United States Patent [19]

Perego

[11] 4,173,355
[45] Nov. 6, 1979

[54] FOLDABLE BABY CARRIAGE WITH FOLDABLE AND ADJUSTABLE FOOT REST

[76] Inventor: Giuseppe Perego, via de Gasperi, Arcore (Milano), Italy, 20043

[21] Appl. No.: 872,368

[22] Filed: Jan. 26, 1978

[30] Foreign Application Priority Data

Oct. 7, 1977 [IT] Italy .............................. 28356 A/77

[51] Int. Cl.² .............................................. B62B 7/06
[52] U.S. Cl. ..................................... 280/642; 280/42; 280/650
[58] Field of Search ................. 280/42, 642, 643, 644, 280/641, 647, 648, 649, 650, 38

[56] References Cited

U.S. PATENT DOCUMENTS

| | | | |
|---|---|---|---|
| 1,167,003 | 1/1916 | McDevitt | 280/42 |
| 3,936,069 | 2/1976 | Giordani | 280/644 |
| 4,007,947 | 2/1977 | Perego | 280/42 X |
| 4,049,292 | 9/1977 | Perego | 280/642 |
| 4,077,641 | 3/1978 | Perego | 280/42 |

Primary Examiner—Joseph F. Peters, Jr.
Assistant Examiner—Milton L. Smith
Attorney, Agent, or Firm—McGlew and Tuttle

[57] ABSTRACT

A folding baby carriage has a foldable foot rest defined by a pair of side members and a centrally disposed central member which are interconnected by a plurality of obliquely disposed tie rods. An adjustable linkage is provided for adjusting the setting of the foot rest relative to the associated seat, and a locking linkage is provided to maintain the front wheels locked in the operative unfolded position of the carriage. The arrangement is such that the foot rest and the front wheels serve as means to support the folded carriage in the upright position.

10 Claims, 9 Drawing Figures

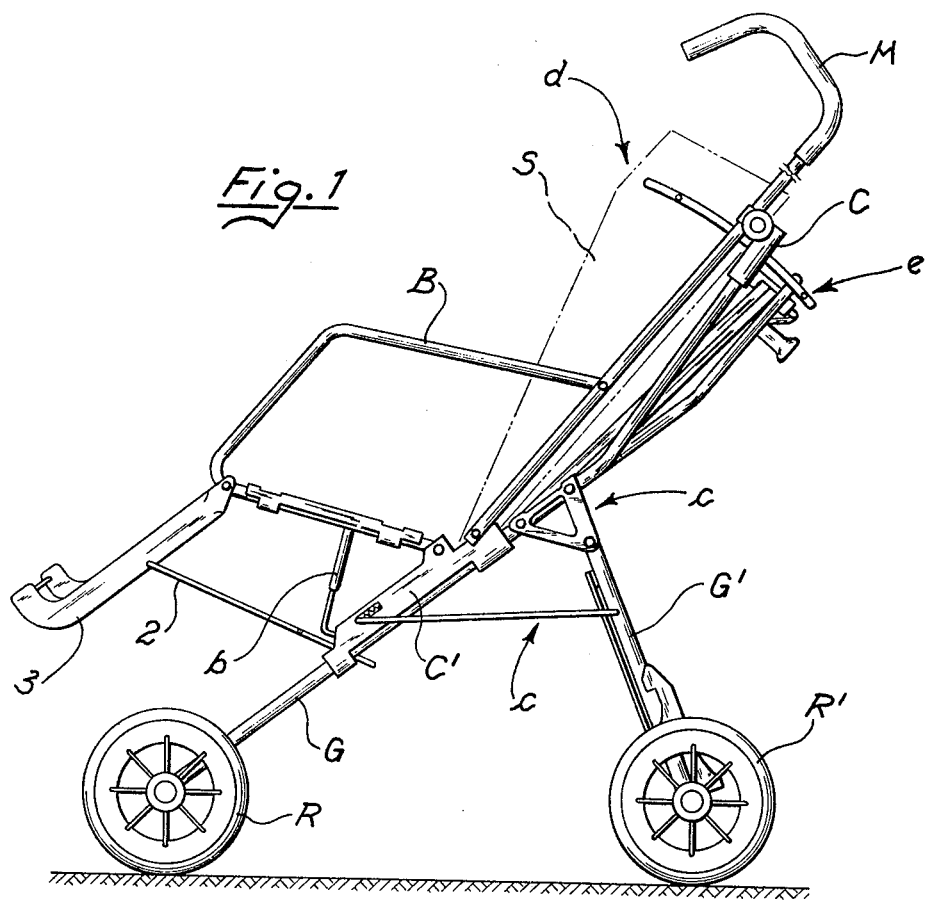
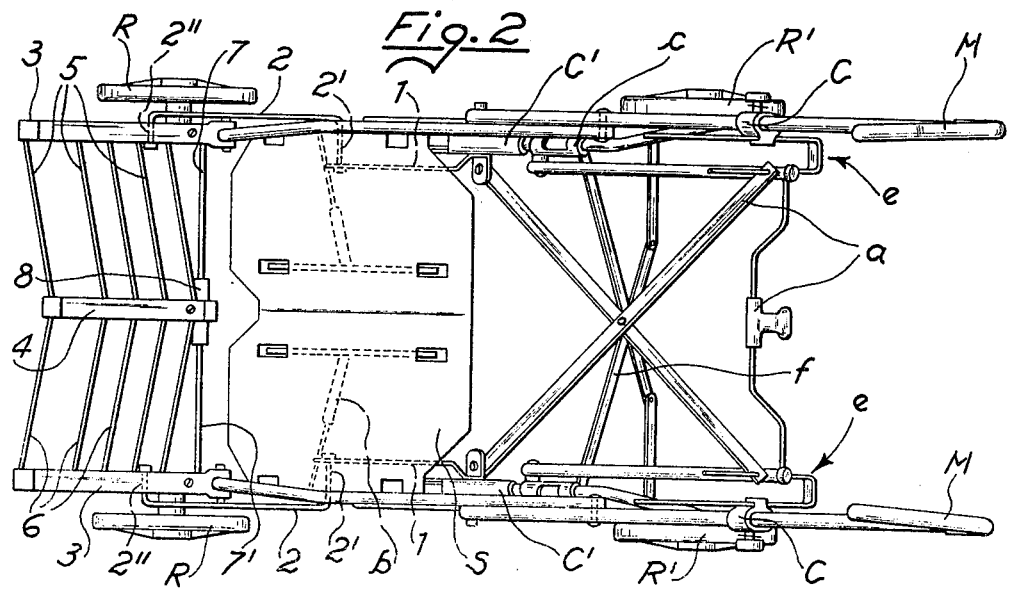

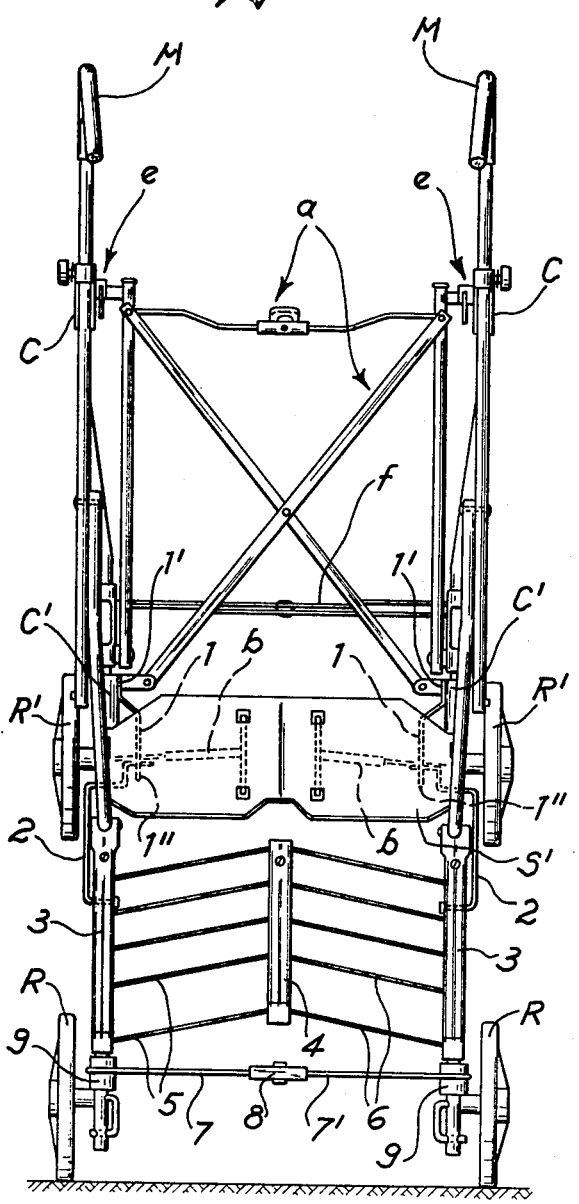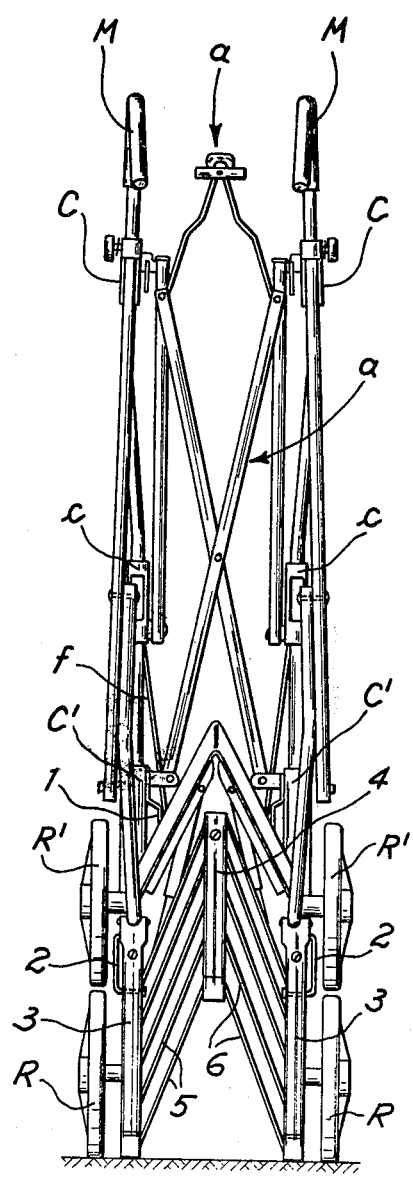

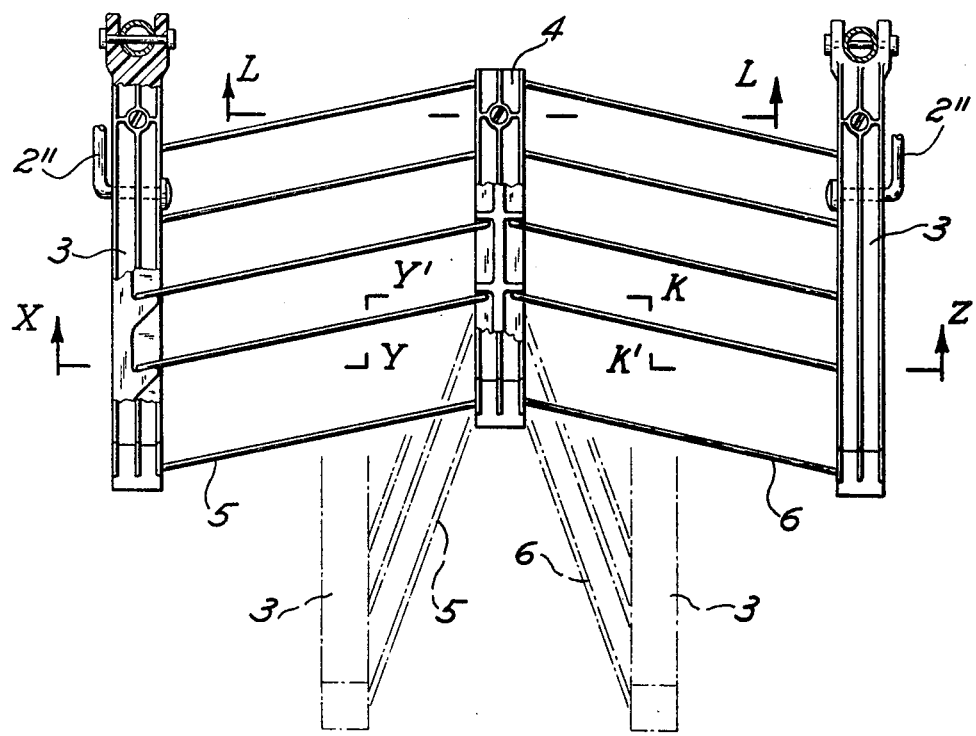
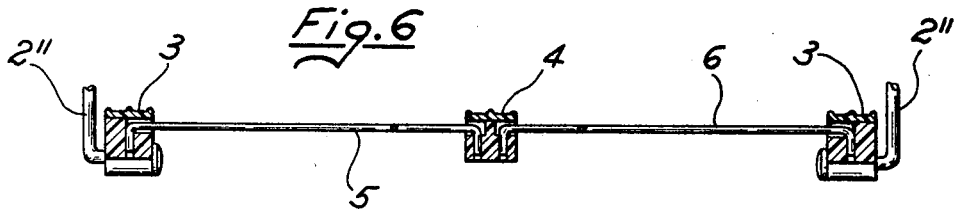
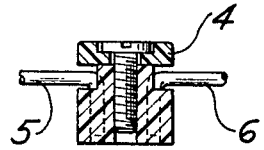
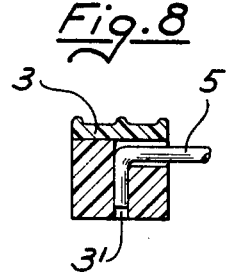
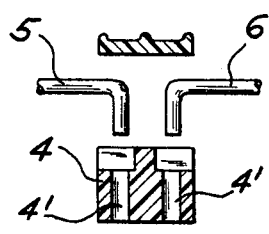

FOLDABLE BABY CARRIAGE WITH FOLDABLE AND ADJUSTABLE FOOT REST

BACKGROUND OF THE INVENTION

1. Field of the Invention

This invention relates to the field of foldable baby carriages which, when folded, are both narrower in width and shorter in height. In particular, the carriage of this invention has an adjustable foot rest or foot board, which is also foldable.

2. The Prior Art

The present invention represents an optimum solution in the field of foldable baby carriages, as noted after a considerable amount of study and tests. It also represents a further substantial improvement to other previous solutions disclosed in my U.S. Pat. Nos. 4,049,292, issued on Sept. 20, 1977; 4,007,947, issued on Feb. 15, 1977; and patent application Ser. No. 713,493 filed on Aug. 11, 1976 and now is issed as U.S. pat. No. 4,077,641 dated Mar. 7, 1978.

The present invention presents further improvements in baby carriages of the type disclosed in the above-mentioned patent and, more specifically, in improvements to the foot rest or foot board for such carriages.

A baby carriage in accordance with the prior art just listed includes the following structural features:

(a) A device comprising a cross piece, four sleeves, a knob, and two tie rods. The ends of the cross piece are connected to two pairs of sliding sleeves, the upper pair on the handles and the lower pair on the front legs of the baby carriage. The actuating knob is located at the center with respect to the upper sleeves and is connected thereto by means of the two tie rods. When a carriage is to be folded into a narrower, shorter bundle, the knob is actuated to pivot the tie rods together and to close the cross piece like scissors.

(b) A pair of U-shaped, tubular arm rests of the seat with the sides of the U more nearly horizontal than vertical and with the free ends of the upper sides attached to the lower portion of the respective handle and the free ends of the lower sides attached to the respective lower sleeve. Each side of the seat structure is hinged on the lower side of the respective U-shaped arm rest and is divided into two parts hinged together at the center. A longitudinal rod is attached to the underside of each half of the seat, and the cylindrical portion of a small telescopic tube is welded to each rod. The sliding inner portion of each of the telescopic tubes terminates at the end of one of the lower sleeves, so that when these sleeves are urged downwardly, the sides of the seat are also pushed down and the center portion is folded up in "book" fashion.

(c) Rear leg actuating means including two triangular small plates hollow at the center pivotally connecting each rear leg to the respective front leg and a side tie rod connecting each rear leg with the lower end of the sliding sleeve on the corresponding front leg, so that the two legs on each side pivot toward each other when the sleeves on the front legs slide down.

(d) A semirigid structure for the seat and seat-back, which is more appropriate for the child's protection and health.

(e) A seat-back inclinable in various positions with respect to the vertical. The seat-back is indirectly connected to the cross-piece and the tie rods that connect the cross-piece to the central knob. The seat-back is connected to the upper sleeves by means of two vertical iron members and two sets of elements, each comprising a strap and pinned with a spring.

(f) An inclined rear cross-piece having two upper ends hinged to the rear legs of the baby carriage and two lower ends hinged to two tie rods which, in turn, are also hinged to the rear legs. This arrangement facilitates automatic folding of the baby carriage by simply actuating the knob located at the center with respect to the upper sleeves.

SUMMARY OF THE INVENTION

The baby carriage according to the invention includes a device to adjust the footrest to various position, comprising on each side:

A strap having an upper end suitably bent and attached to the upper inner portion of one of the lower sleeves as well as to a lower end of the upper crosspiece supporting the seat-back, and having the lower end slightly curved and provided with one or more holes; and A tie rod shaped so as to have one end insertable into one of the holes in the abovementioned strap, and the other end insertable into one of the transversal holes provided in a side piece forming part of the foldable supporting structure of the footrest. There is also provided a special structure supporting the footrest which enables it to be automatically folded in width when the baby carriage is folded. There is also provided a device comprising two lower tie rods having their outer ends curled around an equal number of sleeves on the front legs close to the respective wheels. The inner ends of the latter tie rods are attached to a particular central sleeve so as to enable these two tie rods to rotate into horizontal end positions when the baby carriage is being used and to fold together when the baby carriage is folded.

These and other features of the invention will become readily apparent from the following more detailed description when considered in the light of the accompanying drawings, given by way of example only and without limitation, and which illustrate a preferred embodiment of the baby carriage according to the invention.

BRIEF DESCRIPTION OF THE DRAWINGS

FIG. 1 is a side view of a baby carriage according to the invention where for sake of clarity, the seat-back has been shown in phantom lines and the seat and footrest have been omitted;

FIG. 2 is a top view of the baby carriage of FIG. 1;

FIG. 3 is a front view of the baby carriage of FIG. 1 in its position ready for use;

FIG. 4 is a front view of the baby carriage of FIG. 1 in the folded position.

FIG. 5 is a front view of the footrest supporting structure in its position ready for use, and shown in phantom lines in its folded position;

FIG. 6 is a section along line X-Y-Y'-K-K'-Z of FIG. 5;

FIG. 7 is a portion of the enlarged cross-section along line L-L of FIG. 5; and

FIGS. 8 and 9 also show on an enlarged scale a side and central detail of FIG. 6.

In the drawings, the parts comprising the seat-back, seat, sides and foot rest have been omitted for the sake of clarity and for the fact that they are not new and are per se already known, and may be made in various ways formed as a unit in fabric which may be partially stiffened in the seat-back.

As may be seen from the drawings, the baby carriage, according to the invention, has constructional features similar to those carriages covered by the previously-noted patents and listed as structural features a), b), c), d), e), and f) in the foregoing description of the prior art.

For the sake of clarity, these features have been shown in small letters in the drawings. Also in the drawings, other known parts have been shown in capital letters, for example, M indicates the handle, R-R' the wheels, G the front legs and G' the rear legs, S the seat-back and S' the seat, and C the upper sleeves and C' the lower sleeves, and B the arm rests.

The improvements of the baby carriage according to the present invention have been indicated by reference numerals.

The adjusting device for the foot rest (see FIG. 3) comprises a strap 1 disposed on each side 3. The upper end 1' of each of these straps is fixed to the sleeve C' and to the cross-piece end of the device a. The lower end 1" of each of the straps, which is slightly curved and provided with one or more holes is connected to a tie rod 2 which is shaped so as to have one end 2' inserted into one of the holes of the respective strap 1 and the other end 2" inserted into one of the holes provided in the side piece 3 of the footrest supporting structure.

The footrest supporting structure comprises (see FIGS. 2 and 5) two curved plastic side pieces 3 and a central piece 4, as well as a plurality of metal tie rods, or links, 5 and 6 obliquely connecting the respective side pieces 3 to the central piece 4. The respective tie rods 5 and 6 have been inserted in suitable recesses 3', 4' in the side pieces 3 and the central piece 4, respectively, (see FIGS. 7-9), whereby the footrest structure may be readily folded when the baby carriage itself is folded by raising the central knob of device a.

Once the footrest structure has been folded, it may act also as a support for the baby carriage in the vertical position (see FIG. 4).

Finally, the devices locking the front wheels in a position ready for use at the proper distance and for bringing them close to each other when the baby carriage is folded, comprises the two locking tie rods 7, 7' (see FIGS. 2, 3) and the central sleeve 8.

The remote ends of the tie rods 7, 7' have ends which are curled around two couplings 9 inserted onto the front legs G close to the wheels R. The other ends of said tie rods 7-7 adjacent to each other are connected to the sleeve 8, the tie rod 7 being connected by a straight portion and the tie rod 7' by a bent portion sliding in a suitable slot (not shown in the drawing) in sleeve 8, when the baby carriage is folded.

As will be readily apparent to those skilled in the art, the one illustrated is only a preferred embodiment of the invention and it is to be understood that many variations are possible within its scope.

What we claim is:

1. In a folding carriage adapted to fold between an operative position and an inoperative folded position wherein said carriage is narrowed in width and shortened in height, said carriage having front and rear legs pivotally connected together, a front wheel on each of said front legs and a rear wheel on each of said rear legs, a pair of elongated handles, an upper sleeve attached to a respective one of said front legs and slidably mounted on each of said handles, a lower sleeve slidably mounted on a respective one of said front legs and attached to a respective one of said handles, an actuating knob, first and second tie rods connecting the upper sleeve to said actuating knob, seat means including a foldable seat and associated foldable seat back, each adapted to fold between operative and inoperative positions, and a pair of generally U-shaped arm rests, each having one end connected to a respective one of said handles and the other end connected to the corresponding one of said lower sleeves, the improvement comprising: foot rest means comprising two side pieces, each connected to a respective one of the arm rests, a central piece, and means pivotally connecting said central piece to said side pieces so that said foot rest means is foldable generally centrally; and support means operatively connecting said side pieces to said lower sleeves for enabling said foot rest means to be automatically folded to be narrower when said carriage is folded toward said inoperative position.

2. A baby carriage as defined in claim 1 comprising, in addition: third and fourth tie rods each having one end pivotally connected to a respective one of said front legs near the respective front wheels; and a central member pivotally joining said third and fourth tie rods to permit them to fold together when said baby carriage is folded to its inoperative position, said central member comprising means for holding said front wheels in locked, spaced-apart, relationship in the operative, unfolded position of said carriage.

3. A baby carriage as defined in claim 1, wherein said foot rest support means comprises: a pair of rigid side straps, each having one end connected to a respective one of said lower sleeves; third and fourth tie rods, each having one end connected to a respective side of said foot rest means, and having its other end adjustably connected to the other end of a respective one of said straps to vary the position of said foot rest means.

4. A baby carriage as defined in claim 3, wherein each of said third and fourth tie rods and the respective one of said straps have interconnecting end portions to define complementary adjusting means.

5. A baby carriage as defined in claim 4, wherein said complementary adjusting means includes a plurality of spaced-apart holes formed in said other end of each of said straps, and said other end of each of said third and fourth tie rods is adapted to be received in one of said holes for adjustably locating said foot rest means.

6. A baby carriage, as defined in claim 1, wherein said means pivotally connecting said central piece to said side pieces of said foot rest means comprises: a plurality of tie links interconnecting each of said side pieces to said central piece, each of said links being pivotally connected to said central piece and to a respective one of said side pieces.

7. A baby carriage, as defined in claim 6, wherein each of said side pieces and said central piece have a series of corresponding holes, said tie link having end portions for interconnecting a side piece to said central piece, one of said end portions of each of said tie links fitting into one of said holes of said central piece and the other of said end portions of each of said tie links fitting into one of said holes of one of said side pieces.

8. A baby carriage, as defined in claim 7, wherein said side pieces are curved at their respective lower ends and said curved ends function as supports for said carriage in the folded position.

9. A baby carriage, as defined in claim 7, wherein said tie links have bent end portions, each of said bent end portions being received within a corresponding one of the holes in a respective one of said side pieces and within a corresponding one of the holes in said central piece, each of said tie links being obliquely interconnected between said respective one of said pieces and said central piece.

10. A folding baby carriage adapted to fold between an operative and an inoperative position in which said carriage is shortened in width and height relative to the operative position, said carriage comprising: a pair of front legs; a corresponding pair of rear legs; means for pivotally connecting each said rear leg to a corresponding one of said front legs; a wheel journalled to each of said front legs and to each of said rear legs; a lower sleeve slidably mounted on each of said front legs; a handle connected to each said lower sleeve; a U-shaped arm rest on each side of said carriage, one end of each of said arm rests being attached to a respective one of said handles and the other end of each of said arm rests being attached to a respective one of said lower sleeves; an upper sleeve on each of said handles; seat means pivotally mounted on said other end of each of said arm rests, said seat means including a centrally foldable seat; a rear cross piece interconnected between said upper and lower sleeves; first and second tie rods; an actuating knob connected to the adjacent end of each of said tie rods; foot rest means comprising a pair of side pieces connected to said arm rests and a central piece disposed between said side pieces; a plurality of connecting links interconnecting their respective side pieces and the central piece, each of said side pieces and said central piece having a plurality of corresponding holes, said connecting links having bent end portions in said corresponding holes, each of said side members having a curved end portion to function as a support for said carriage in the folded position; and means for adjusting the position of said foot rest means in the operative position of said carriage, said adjusting means comprising a strap having one end connected to said lower sleeve, and third and fourth tie rods each having one end connected to a respective one of said side pieces and having its other end adjustably connected to the respective one of said straps, whereby said foot rest means is adjustable; and means for locking said front wheels in operative spaced apart position, said locking means comprising fifth and sixth tie rods and a locking sleeve interconnecting adjacent ends of said fifth and sixth tie rods, the other ends of said fifth and sixth tie rods being connected to one of said front legs, respectively.

* * * * *